United States Patent

Furrer

[11] Patent Number: 5,143,631
[45] Date of Patent: Sep. 1, 1992

[54] FILTERING DEVICE, ESPECIALLY FOR THE SEPARATION OF COARSE PARTICLES FROM A LUBRICANT SUSPENSION, AND PROCESS FOR ITS USE

[75] Inventor: Hansjörg Furrer, Ziefen, Switzerland

[73] Assignee: Lonza Ltd., Gampel, Switzerland

[21] Appl. No.: 725,471

[22] Filed: Jul. 3, 1991

[30] Foreign Application Priority Data

Oct. 7, 1990, [CH] Switzerland .......... 2297/90

[51] Int. Cl.[5] .......................................... B01D 33/46
[52] U.S. Cl. .................... 210/791; 210/397; 210/398; 210/408; 210/414
[58] Field of Search ............... 210/414, 767, 791, 407, 210/391, 396, 397, 398, 408, 413, 414, 415

[56] References Cited

U.S. PATENT DOCUMENTS

| | | | |
|---|---|---|---|
| 2,234,971 | 3/1941 | Kelso | 80/13 |
| 4,022,043 | 5/1977 | Chevet | 72/97 |
| 4,052,323 | 10/1977 | Feneberger et al. | 252/23 |
| 4,693,815 | 9/1987 | Collins | 210/414 |
| 4,808,324 | 2/1989 | Periard et al. | 252/23 |

FOREIGN PATENT DOCUMENTS

| | | |
|---|---|---|
| 2823092 | 12/1978 | Fed. Rep. of Germany. |
| 56-9008 | 1/1981 | Japan. |
| 58-116910 | 7/1983 | Japan. |
| 2163691 | 3/1986 | United Kingdom. |

Primary Examiner—Frank Sever
Attorney, Agent, or Firm—Fisher, Christen & Sabol

[57] ABSTRACT

The housing (2, 3, 4) of the filtering device has a cover (4), provided with a filtrate outlet (9), a cover that is detachable applied to a housing part (3) exhibiting an intake (7) for the suspension (8) to be filtered. A filter (11) is placed between housing part (3) and cover (4). A rotor (14), provided with stripping lamellae (17) for stripping the solids settling on the filter (11), rotates in the housing (2, 3). The filter (11) is formed by a flat, plane screen (11) placed perpendicular to the axis of a rotor (22). The intake (7) is aligned radially to the lamellae (17). For replacing or cleaning the filter (11), it suffices to remove the housing cover (4). The lamellae (17) are cleaned by the suspension flowing in the filtering device.

10 Claims, 1 Drawing Sheet

FILTERING DEVICE, ESPECIALLY FOR THE SEPARATION OF COARSE PARTICLES FROM A LUBRICANT SUSPENSION, AND PROCESS FOR ITS USE

BACKGROUND OF THE INVENTION

1. Field Of The Invention

The invention relates to a filtering device, especially for the separation of coarse particles from a lubricant suspension, and a process of using the device in a unit for spraying liquid at intervals, especially of a lubricant suspension to be sprayed under high pressure.

2. Background Art

A filtering device of this type is known from German Patent No. 2,823,092. The known device has a housing which is a head part, a cylindrical center part and a base part. The head part has an intake for the suspension to be filtered, and the base part has a filtrate outlet. A cylindrical round filtering basket is placed in the cylindrical center part. A rotor shaft driven by a motor extends through the head part and center part into the base part. The center part carries stripping lamellae (cleaning lamellae), which strip from the filter the solids settling on the filter. Further, a bottom settlings chamber is made in the base part for the coarse particles (filter cake particles) stripped from the filtering basket. The chamber has a bottom settlings outlet - agitator blades, provided on the lower end of the rotor, rotate therein to keep the coarse particles in suspension. To maintain the device, particularly to clean the filtering basket, the housing head had to be detached from the center part and together with the entire heavy structure including the motor, rotor shaft and the rotor with the lamellae, as well as all other parts fastened to the rotor shaft and the filtering basket, had to be removed from the center and base part, which was expensive and laborious. In addition solids, such as, a filter cake, settled on the lamellae or between them, which with increasing size greatly adversely affected the throughput and finally made it almost impossible. (In the "filter cake" growing between the lamellae, first the axial passage ducts remained open but then continuously narrowed.)

BROAD DESCRIPTION OF THE INVENTION

The main object of the invention is to provide means which facilitate the maintenance of the filtering device and prevent or at least reduce the formation of the filter cake-like deposits on the lamellae. Other objects and advantages of the invention are set out herein or are obvious herefrom to one skilled in the art. The objects and advantages of the invention are achieved by the filter device and process of the invention.

The invention involves a filtering device, especially for the separation of coarse particles from a lubricant suspension. The invention filtering device includes a housing (2, 3, 4) exhibiting an intake (7) for the suspension to be filtered (8) and a filtrate outlet (9). There is a housing in which are placed a filter (11) and a rotor (14) exhibiting at least one stripping lamella (17) for stripping the solids settling on the filter (11). The filter (11) is formed by a flat, plane filter means (11) placed perpendicular to the rotor axis (22), which is placed between a housing part (3) exhibiting the intake (7) for suspension (8) to be filtered and housing the lamella or lamellae (17). There is a housing cover (4) detachably placed on the housing part and exhibiting the filtrate outlet (9) so that it can be cleaned and replaced after removal of the housing cover (4).

Preferably the intake (7) comes out at least approximately radially to the rotor axis (22) into the interior (24) of the housing part (3). The intake (7) more preferably comes out radially so near the filter (11) into the interior (24) of the housing part ( ) that the suspension (8) flowing through the intake (7) is directed at least partially to the lamella or lamellae (17) so that the solids settling on the lamella or lamellae are washed away. Preferably the housing part (3) exhibits a bottom settlings outlet (25), which is to be connected to a drain (27) equipped with a shutoff device (26) for removal of the bottom settlings forming from the solids stripped by the lamella or lamellae (17) from the filter (11). Preferably the intake (7) and the bottom settlings outlet (25) are placed opposite one another so that the lamella or lamellae (17) are at least partially between the intake (7) and the bottom settlings outlet (25), so that with feeding the suspension (8) to be filtered through the intake (7), and quite preferably with discharge of the bottom settlings occurring under the running rotor (14) a turbulent flow results around the lamella or lamellae (17), by which solids adhering to the lamella or lamellae (17) are washed away. The filter (11) quite preferably formed by a screen is detachably fastened to a filter support (19) provided with the openings (21), which is placed between the housing part (3) and the housing cover (4). Preferably the housing cover (4) is detachably fastened to the housing (2, 3) by bolts (23) passed through the filter (11) and/or the filter support (19). Preferably the lamella or lamellae (17) are mounted to slide axially between the guide surfaces (30) provided on the rotor (14) and are pressed by the compression springs (29) in the direction of the filter (11), and the lamella or lamellae (17) project beyond the guide surfaces (30) at least in the axial direction. Preferably each or all of the lamella (17) between the guide surfaces (30) are provided a stop (31), which engages through a hole (32) in the lamella (17) and limits the displacement of the lamella (17) by the compression springs (29) so that the lamella (17) is held on the rotor (14) when the filter (11) is removed for cleaning or replacing.

The invention also includes the use of the invention filtering device in a unit for spraying liquid at intervals, especially of a lubricant suspension to be sprayed under high pressure. The filtrate (10) is sprayed at intervals and at the end of each spraying interval or at periods at the end of a spraying interval, each shutoff device (26) of the drain (27) connected to the bottom settlings outlet (25) is opened with the suspension (8) being under pressure at the intake (7). The invention process achieves the object of using the device according to the invention in a unit for spraying liquid at intervals, especially a lubricant suspension to be sprayed under high pressure.

In the device according to the invention, it suffices for cleaning the filter to remove the cover. The filter can then easily be removed and cleaned or replaced. The entire remaining part of the device with the rotor and the motor driving the rotor in this case remains in its place. Since the filter is not a cylindrical basket but a flat, plane disk, it can easily be cleaned.

Deposits of solids (coarse particles, filter cake) separated by the filter and stripped by the lamella or lamellae on the lamella or lamellae are avoided in that the intake for the suspension to be filtered is formed in the housing part housing the lamellae and the intake preferably comes out radially to the rotor axis so near the filter into the interior of the housing part that the suspension flowing through the intake is directed at least partially to the lamellae. Consequently, the solids settling on the lamellae are washed away by the suspension to be filtered.

To remove the bottom settlings forming solids stripped by the lamellae from the filter, the housing part suitably has a bottom settlings outlet which can be connected to a drain equipped with a shutoff device. The bottom settlings outlet preferably is placed diametrically opposite the intake so that the lamellae are at least partially between the intake and bottom settlings outlet and the above-mentioned cleaning of the lamellae is promoted. With feeding the suspension to be filtered through the intake and preferably with discharge of the bottom settlings occurring under the running rotor, a turbulent flow results in the direction of the lamella edges and surfaces as well as around them, by which solids adhering to the lamellae are washed away.

Other advantages and preferred properties of the device according to the invention and the use of the device according to the invention are seen from the following description of an embodiment of the invention with the drawing.

IN THE DRAWINGS

In the drawings:

FIG. 1 is an axial longitudinal section through the filtering device according to the invention; and FIG. 2 is a block diagram of the arrangement of the filtering device in a unit for spraying at intervals a lubricant suspension under high pressure.

DETAILED DESCRIPTION OF THE INVENTION

Figure 1:
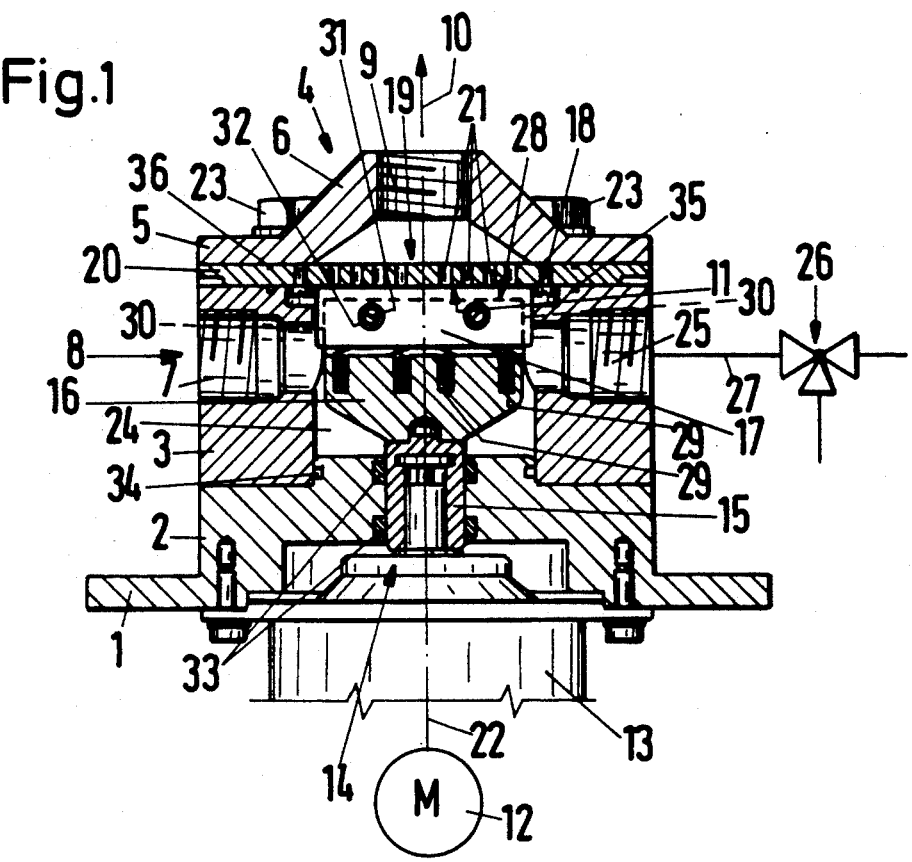
Figure 2:
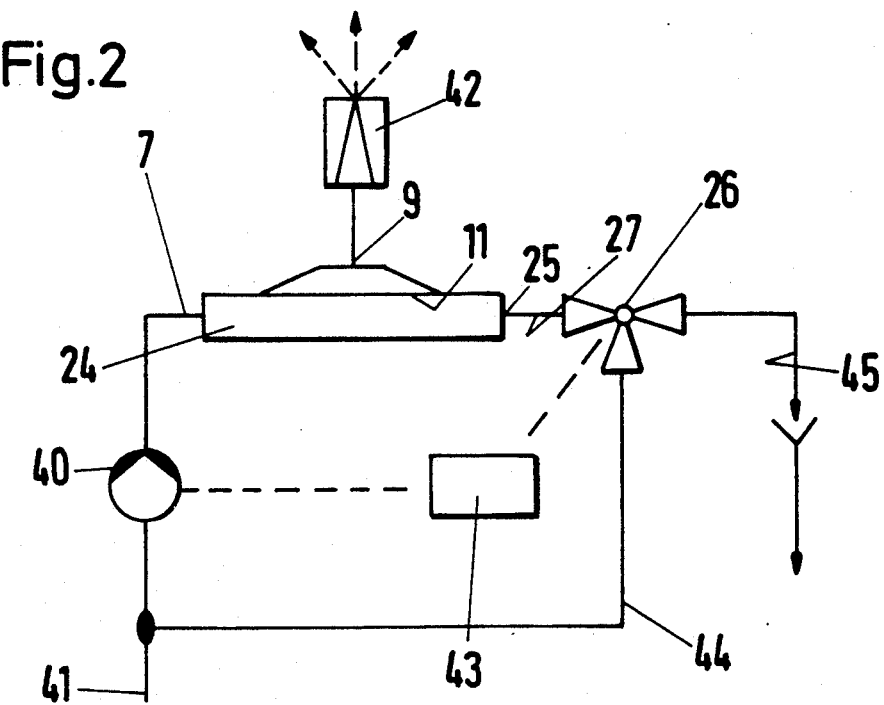

The filtering device represented in the drawings serves for the separation of coarse particles from a lubricant suspension and can be used, for example, in a unit for spraying a lubricant suspension at intervals, as described in commonly-owned U.S. Ser. No. 673,799, filed on Mar. 22, 1991, (and corresponding Swiss Patent Application No. 996/90, filed on Mar. 26, 1990), (both of which are not prior art), and diagrammatically represented in FIG. 2.

The pertinent parts, including the drawings, of commonly owned U.S. Ser. No. 673,799, filed on Mar. 22, 1991, and entitled "Process And Device For Spraying A Liquid Intermittently, Especially A Lubricant Suspension To Be Sprayed Under High Pressure", are incorporated herein. U.S. Ser. No. 673,799 discloses a process for spraying a liquid intermittently, especially a lubricant suspension to be sprayed under high pressure, by means of a spray nozzle which automatically opens like an excess pressure valve when the input pressure of the liquid exceeds the threshold value pressure and, when the inlet pressure of the liquid falls short of the threshold value pressure, automatically closes. In the process, the liquid is conveyed, without interposition of a shutoff device, directly from a pump to the spray nozzle. The pump initial pressure is maintained at a pause pressure in the pauses between the spraying intervals, is increased to the spraying pressure for spraying the liquid and is lowered to the pause pressure again at the end of the spraying interval. The pause pressure is calculated so that it is just insufficient to open the spray nozzle. U.S. Ser. No. 673,799 also discloses a device for performing such a process. The device has a spray nozzle which automatically opens like an excess pressure valve when the input pressure of the liquid exceeds the threshold value pressure and, when the inlet pressure of the liquid falls short of the threshold value pressure, automatically closes. In the device, a pump is, without interposition of a shutoff device, in constant, direct liquid connection with the spray nozzle. There is a pressure control device, by which the pump output pressure can be increased to the spraying pressure from the pause pressure, which is just insufficient in amount to open the spray nozzle, and lowered again.

The housing of the device has a base part 2 provided with the fastening flange 1, the hollow cylindrical center part 3 and the cover 4 with the annular peripheral edge 5 and the upward arched shell part 6. The intake 7 for the suspension 8 to be filtered runs radially through the jacket of the hollow cylindrical center part 3. The outlet 9 for the filtrate 10 is provided in the center of the upward arched or bulged shell part 6 of the cover 4. The filter 11 is placed between the center part 3 and the cover 4. The electric motor 12 drives the rotor 14 by the gear 13. The rotor 14 has the cylindrical part 15 going through the axial bore of the base part 2 and the support part 16—enlarging upward, placed in the center part 3—on whose upper side are mounted the stripping lamellae 17, which strip solids settling o the filter 11.

The filter 11 is a screen formed by an annular flat, plane perforated sheet metal with a mesh size of 0.5 mm. The diskshaped screen 11 is detachably bolted on the underside of the annular screen support plate (filter support plate) 19 by the bolts 18 placed at distances along its peripheral edge. The screen support plate 19 has the same outside diameter as the hollow cylindrical center part 3 and is clamped with its annular peripheral edge 20 between the upper front of the hollow cylindrical center part 3 and the peripheral edge 5 of the cover 4. The outside diameter of screen 11 is a tolerance smaller than the inside diameter of the hollow cylindrical center part 3, so that the screen 11 is within the clamped peripheral edge 20 of the screen support plate 19. The screen support plate 19 in the area of the screen 11 exhibits a plurality of the bores 21 for the passage of the filtrate 10. The screen support plate 19 serves as a support plate for the screen 11, is placed perpendicular to the rotor axis 22 and guarantees that the thin, flexible screen 11, even at high prevailing input pressures of, e.g., 80 bars, remains flat and is kept perpendicular to the rotor axis 22.

The cover 4 is fastened to the base part 2 by bolts engaging through holes (not visible in the drawing) in the peripheral edge 20 of the screen support 19 and bores (not visible) in the center part 3 so that it can be quickly unscrewed and that the screen support 19 can be removed from the center part 3 for cleaning or replacement of the screen 11. If necessary, in this case, also the center part 3 can be removed from the base part 2 for maintenance of the rotor 14 (e.g., replacement of worn lamellae 17).

The intake 7, which comes out radially to the rotor axis 22 into the interior 24 of the hollow cylindrical center part 3 is placed as close as possible to the upper front of the center part 3 and, thus, of the screen 11. The distance of the intake 7 from the upper front in this case is selected to be only as large as necessary so that the part of the wall of the center part 3, which has a recess because of the fastening bolts 18 of the screen 11, is still sufficiently stable. As a result of this necessary (only for reasons of material strength) distance, the intake 7 is offset somewhat downwardly relative to the lamellae 17. Because of the offset, the suspension 8 flowing through the intake 7 is not directed—as would be best for its functioning —to entirety of the lamellae 17 but only to their lower half, but which, as tests have shown, is still sufficient for the desired action, namely, the washing away of the solids settling on the lamellae 17.

Diametrically-opposite of the intake 7 is the bottom settlings outlet 25 which, like the intake 7, runs radially to the rotor axis 22 through the jacket of the hollow cylindrical housing part 3. The bottom settlings outlet 25 is connected to the discharge pipe or drawing 27 equipped with the shutoff device 26 designed as a three-way valve for discharge of the bottom settlings forming solids stripped by the lamellae 17 from the screen 11. (The purpose of the three-way valve 26 is further explained below in connection with the use of the filtering device. Since the lower halves of the lamellae 17 are between the intake 7 and the bottom settlings outlet 25, with the feeding suspension 8 to be filtered through the intake 7 and preferably with discharge of the bottom settlings occurring under the running rotor 14, a turbulent flow occurs around the lamellae 17 by which the solids adhering to the lamellae 17 are washed away. As a result of the flow direction, which is diametrical to the rotor axis 22, between the intake 7 and the outlet 25 and the rotation of the lamellae 17, an input flow thus strikes the lamellae 17 at different angles depending on the rotation position: parallel to the respective lamella 17 located at the intake 7, the input flow strikes its edge and penetrates the slot 28 of the support part 16 described below and washes it out; with further rotation then at increasing and, after going beyond the right angle, again decreasing acute angle obliquely the input flow strikes the part of the lamella 17 projecting over the slot 28, and especially a great cleaning action is achieved by the input flow penetrating in the former case parallel into the slot 28.

The stripping lamellae 17 are rectangular polyethylene plates, are mounted to slide axially into the radial slots 28 on the top of the upward enlarging support part 16 of the rotor 14 and are pressed in the direction of the screen 11 by the compression springs 29 placed in bores of the support part. They project axially and radially above the guide surfaces formed by the slot walls 30. Through the slot walls 30, for each lamella 17, a pin (setscrew) 31 is screwed whose part, between guide surfaces 30, engages through a hole 32 in the lamella 17 dimensioned greater than the pin diameter and as a stop limits the displacement of the lamella 17 by the compression springs 29 so that the lamella 17 is held on the rotor part 16 when the screen support 19 is removed for cleaning or replacing the screen 11. Depending on the extent to which the filter cake is formed, only one or more lamellae 17 can be provided, which are placed radially at equal angular distances from one another, and a corresponding number of slots is provided in the rotor head part. Two to four lamellae 17 have proved particularly suitable for the present use.

The intake 7 and outlets 9, 25 are provided with threaded connections for connecting to connecting pipes.

For sealing, the interior 24 of the hollow cylindrical center part 3 and the cover interior, through which the liquid flows, the base part 2 is sealed by two shaft seals 33 on the rotor part 15 and the O-ring 34 on the center part 3. The latter is sealed by the O-ring 35 on the peripheral edge 20 of the screen support plate 19, and the peripheral edge 20, for its part, is sealed by the O-ring 36 on the peripheral edge 5 of the cover 4.

The filtering device can be used in a unit for spraying, at intervals, a lubricant suspension to be sprayed under high pressure as described below in conjunction with FIG. 2.

The lubricant suspension is transported by the pump 40 via the suction pipe 41 and pumped for separation of coarse particles through the intake 7 into the filtering device, whose outlet 9 is connected to the spray nozzle 42 which automatically opens, like a relief pressure valve, when the input pressure (the lubricant suspension) exceeds a threshold value pressure and automatically closes when the input pressure drops below the threshold value pressure.

The output pressure of the pump 42 is maintained at a pause pressure by the control device 43 in the pauses between spraying intervals, is raised to the spraying pressure for spraying the liquid and, after the spraying interval, again drops to the pause pressure. The pause pressure is measured so that it is just not quite sufficient to the open (activate) spray nozzle 42.

At the end of the spraying interval, the three-way valve 26, controlled by the control device 43, is opened (and before the beginning of the next spraying interval is closed again), and there is a flow through the interior 24 of the filtering device diametric to the rotor axis 22. The lamellae 17 and the filter screen 11 are, thus, cleaned as well as the coarse particles (filter cake parts) in the interior 24 being washed away by the drain 27.

The drain 27 can optionally be connected by the three-way valve 26 with the return pipe 44 to the pump 40 or the sewer 45. In the case of the suspension having a slight coarse particle content, the drain 27 in each case is connected with the return pipe 44 to the pump 40, and the removed coarse particles are fed back again by the pump 40 and the intake 7 into the filtering device—the bottom settlings, thus, are not finally removed but by the diametrical flow through the space 24 to and around the lamellae 17 the latter in each case are cleaned. The drain 27 in this case is only rarely connected to the sewer 45: it is only connected if a high coarse particle concentration (coarse particle bottom settlings) is formed in the space 24. This seldom infrequent connection to the sewer 38 can take place by the control device 43 controlling the three-way valve 26 automatically each time after a certain number of openings of the valve 26 or by manual operation of the multiway valve 26.

With a high coarse particle content of the suspension, the multiway valve 26 correspondingly is more often connected to the sewer 45 so that the coarse particles are finally removed. A too frequent opening of the valve 26, of course, is not aimed at since in each case not only the undesired coarse particles are removed but also (valuable) lubricant is removed along with the particles.

As a result of the arrangement opposite one another of the intake 7 and the outlet 25 with interposed lamellae 17 and the frequent opening of the valve 26 (in the pipe 44 or 45), as mentioned, a cleaning of the lamellae 17 is achieved by this flow penetrating through the slots 28 and bouncing from these projecting lamella parts as well as the resulting turbulences, which is very effective at a high initial pressure at the intake 7. In this case, the pressure in the space 24 at the opening of the valve 26 decreases almost abruptly so that a pressure surge results by which the turbulences and, thus, the cleaning actions are intensified even more. The rotor 14 with the lamellae 17 in this case is further rotated by the motor 12 so that the cleaning flow covers all of the lamellae 17 in different positions, i.e., acts on the lamellae at different angles depending on the lamella position, which also contributes to the high cleaning action. The pressure surge and, thus, the cleaning action, finally takes in not only the lamellae 17 but also the screen 11; by the abrupt flow through the space 24 parallel to the screen 11 the liquid sweeps along the screen 11 and optionally washes away from it the particles not stripped by the lamellae 17.

Suspensions containing graphite which can be used, for example, are described in U.S. Pat. Nos. 4,052,323 and 4,808,324.

What is claimed is:

1. Filtering device, especially for the separation of coarse particles from a lubricant suspension, comprising:
    a housing, (2, 3, 4) having a housing part (3) and a housing cover (4), detachably placed on the housing part (3),
    said housing part (3) exhibiting an interior (24) and an intake (7) for the suspension (8) to be filtered, and said housing cover (4) exhibiting a filtrate outlet (9),
    a rotor (14), arranged in said interior (24) of said housing part (3), and a rotor axis extending in an axial direction (22),
    a filter (11) being formed by a flat, plane filter means (11), arranged perpendicular to said axial direction (22) between said housing part (3) and said housing cover (4), so that it can be replaced after removal of the housing cover (4).
    said rotor (14) including at least one stripping lamella (17) for stripping the solids settling on the filter (11) and guide surface means (30) and compression spring means (29) for guiding and pressing said at least one lamella (17),
    said at least one lamella (17) projecting beyond said guide surface means (30) at least in said axial direction (22) and being mounted to slide in said axial direction (22) between said guide surface means (30) and being pressed by said compression spring means (29) in said axial direction (22) onto said filter (11), in order to slide on the filter and thereby strip the solids away from the filter when said rotor (14) is rotating,
    said intake (7) coming out at least approximately radially to said axial direction (22) so close to the filter (11) into said interior (24) of said housing part (3), that suspension (8) flowing through said intake (7) is directed at least partially onto the at least one lamella (17) in order to wash away solids settling on the at least one lamella (17) due to the stripping action.

2. Filtering device according to claim 1 wherein the housing part (3) exhibits a bottom settlings outlet (25), which is to be connected to a drain (27) equipped with a shutoff device (26) for removal of the bottom settlings forming from the solids stripped by the at least one lamella (17) from the filter (11).

3. Filtering device according to claim 2 wherein the intake (7) and the bottom settlings outlet (25) are placed opposite one another so that the at least one lamella (17) are at least partially between the intake (7) and the bottom settlings outlet (25), so that with feeding the suspension (8) to be filtered through the intake (7) a turbulent flow results around the at least one lamella (17), by which solids adhering to the at least one lamella (17) are washed away.

4. Filtering device according to claim 3 wherein there is discharge of the bottom settlings under running rotor (4).

5. Filtering device according to claim 4 wherein the filter (11) is detachably fastened to a filter support (19) provided with openings (21), which is placed between the housing part (3) and the housing cover (4).

6. Filtering device according to claim 5 wherein the filter (11) is formed by a screen.

7. Filtering device according to claim 5 wherein the housing cover (4) is detachably fastened to the housing (2, 3) by bolts (23) passed through the filter (11) or the filter support (19) or both.

8. Filtering device according to claim 1, wherein for each of the at least one lamella (17) between the guide surfaces (30) is provided a stop (31), which engages through a hole (32) in each of the at least one lamella (17) and limits the displacement of each of the at least one lamella (17) by the compression springs (29) so that the at least one lamella (17) are held on the rotor (14) when the filter (11) is removed for cleaning or replacing.

9. Process providing a filtering device, especially for the separation of coarse particles form a lubricant suspension, comprising:
    a housing, (2, 3, 4) having a housing part (3) and a housing cover (4), detachably placed on the housing part (3),
    said housing part (3) exhibiting and interior (24) and an intake (7) for the suspension (8) to be filtered, and said housing cover (4) exhibiting a filtrate outlet (9) and a bottom settlings outlet (25), which is to be connected to a drain (27) equipped with a shout-off device (26) for removal of the bottom settlings forming from the solids stripped by the at least one lamella (17) from a filter (11),
    a rotor (14), arranged in said interior (24) of said housing apart (3), and a rotor axis extending in an axial direction (22),
    a filter (11) being formed by a flat, plane filter means (11), arranged perpendicular to said axial direction (22) between said housing part (3) and said housing cover (4), so that it can be replaced after removal of the housing cover (4),
    said rotor (14) including at least one stripping lamella (17) for stripping the solids settling on the filter (11) and guide surface means (30) at least in said axial direction (22) between said guide surface means (30) and being pressed by said compression spring means (29) in said axial direction (22) onto said filter (11), in order to slide on the filter and thereby strip the solids away from the filter when said rotor (14) is rotating,
    said intake (7) coming out at least approximately radially to said axially direction (22) so close to the filter (11) into said interior (24) of said housing part (3), that suspension (8) flowing through said intake (7) is directed at least partially onto the at least one lamella (17) in order to wash away solids settling on the at least one lamella (17) due to the stripping action,
    filtering device in a unit for spraying liquid at intervals, especially of a lubricant suspension to be sprayed under high pressure spraying a filtrate (10) at intervals and at the end of each spraying interval or at periods at the end of a spraying interval and opening each of the shutoff device (26) of the drain (27) connected to the bottom settlings outlet (25) with the suspension (8) being under pressure at the intake (7).

10. Process comprising using the filtering device according to claim 9 in a unit for spraying liquid at intervals, especially of a lubricant suspension to be sprayed under high pressure, in which a filtrate (10) is sprayed at intervals and at the end of each spraying interval or at periods at the end of a spraying interval each of the shutoff device (26) of the drain (27) connected to the bottom settlings outlet (25) is opened with the suspension (8) being under pressure at the intake (7).

* * * * *

UNITED STATES PATENT AND TRADEMARK OFFICE
CERTIFICATE OF CORRECTION

PATENT NO. : 5,143,631

DATED : September 1, 1992

INVENTOR(S) : Hansjorg FURRER

It is certified that error appears in the above-identified patent and that said Letters Patent is hereby corrected as shown below:

ON THE TITLE PAGE:

--[30]  Foreign Application Priority Data

July 10, 1990 [CH] Switzerland ....... 2297/90--

Signed and Sealed this

Second Day of November, 1993

*Attest:*

*Attesting Officer*

BRUCE LEHMAN

*Commissioner of Patents and Trademarks*